United States Patent
Song et al.

(10) Patent No.: US 7,457,471 B2
(45) Date of Patent: Nov. 25, 2008

(54) METHOD OF ADAPTIVELY ENCODING AND DECODING MOTION IMAGE AND APPARATUS THEREFOR

(75) Inventors: Byung-cheol Song, Gyeonggi-do (KR); Kang-wook Chun, Gyeonggi-do (KR)

(73) Assignee: Samsung Electronics Co.. Ltd., Suwon-Si (KR)

( * ) Notice: Subject to any disclaimer, the term of this patent is extended or adjusted under 35 U.S.C. 154(b) by 729 days.

(21) Appl. No.: 10/326,271

(22) Filed: Dec. 23, 2002

(65) Prior Publication Data

US 2003/0219160 A1 Nov. 27, 2003

(30) Foreign Application Priority Data

May 22, 2002 (KR) ................. 2002-28364

(51) Int. Cl.
*G06K 9/36* (2006.01)
(52) U.S. Cl. .............. 382/236; 382/232; 382/239
(58) Field of Classification Search ......... 382/236–239, 382/232–235; 375/240.02, 240.03, 240.12, 375/240.22, 240.29; 348/407.1, 620; 358/448, 358/539
See application file for complete search history.

(56) References Cited

U.S. PATENT DOCUMENTS

| | | | |
|---|---|---|---|
| 5,764,805 A * | 6/1998 | Martucci et al. | ............ 382/238 |
| 6,188,792 B1 * | 2/2001 | Chujoh et al. | ............... 382/236 |
| 6,798,835 B2 * | 9/2004 | Sugiyama | .............. 375/240.12 |

FOREIGN PATENT DOCUMENTS

| | | |
|---|---|---|
| JP | 2002-125227 | 4/2002 |
| KR | 1997-0057989 | 7/1997 |
| KR | 10-0234247 | 9/1999 |
| KR | 10-0289852 | 2/2001 |
| KR | 2001-0104058 | 11/2001 |
| WO | WO00/64187 | 10/2000 |

OTHER PUBLICATIONS

Youn et al. ("Motion estimation for high performance transcoding", IEEE Transaction on Consumer Electronics, vol. 44, No. 3, Published on Aug. 1998, p. 649-658).*
Youn et al. ("A fast motion vector composition method for temporal transcoding", IEEE, Published on 1999, pp. IV-243 to IV-246).*

(Continued)

*Primary Examiner*—Duy M Dang
(74) *Attorney, Agent, or Firm*—Staas & Halsey LLP

(57) ABSTRACT

In a method of adaptively encoding input image data of a motion image in accordance with a temporal complexity of the motion image, and an apparatus therefore, the temporal complexity of the input image data is calculated. Next, an original frame rate of the input image data is converted into a converted frame rate based on the calculated temporal complexity. Thereafter, the input image data whose frame rate has been converted is encoded, and the encoding data of the encoded image data is controlled so that the encoded image data has information on the converted frame rate. Accordingly, the input image data is encoded at different frame rates in accordance with the temporal complexity of the input image data. Consequently, the encoded input image data is efficiently stored.

21 Claims, 7 Drawing Sheets

OTHER PUBLICATIONS

Schwendowius et al. ("Data-adaptive digital video format conversion algorithms", IEEE Transactions on circuits and systems for video technology, vol. 7, No. 3, Published on Jun. 1997, pp. 511-526).*

Kim et al. ("An efficient video down conversion algorithm using modified IDCT basis functions", IEEE, Published on 1999, pp. 914-918).*

Fung, Kai-Tat et al., "Dynamic Frame Skipping For High-Performance Transcoding" published in *Image Processing, 2001, Proceedings, 2001 International Conference* on Oct. 7, 2001; pp. 425-428.

Hwang, J.N., et al., "Dynamic frame-skipping in video transcoding", in IEEE Second Workshop in Multimedia Signal Processing, 1998, pp. 616-612.

ITU-T Recommendation H.262 Amendment 1(Nov. 2000), General Secretariat International Telecommunication Union, Geneva, Apr. 22, 2002.

Fung, K.T., et al., "Dynamic Frame Skipping for High-Performance Transcoding", in Proceedings of IEEE International Conference on Image Processing, 2001, vol. 1, pp. 425-428.

Office Action issued on Jan. 9, 2007 in German Patent Application No. 102 48 019.2-55 that corresponds to the present pending US patent application (6 pages) (5 pages of English translation).

Office Action issued on Feb. 12, 2008 in the corresponding Korean Patent Application No. 10-2002-0028364 (4 pages).

Non-Final Rejection issued by the Korean Intellectual Property Office on Feb. 12, 2008 in the corresponding Korean Application No. 10-2002-0028364 (3 pages) including the cited English language reference "Variable Bit Rate Motion Image Encoding Apparatus" (12 pages).

Korean Patent Office Action, mailed Jun. 13, 2008 and issued in corresponding Korean Patent Application No. 10-2002-0028364.

* cited by examiner

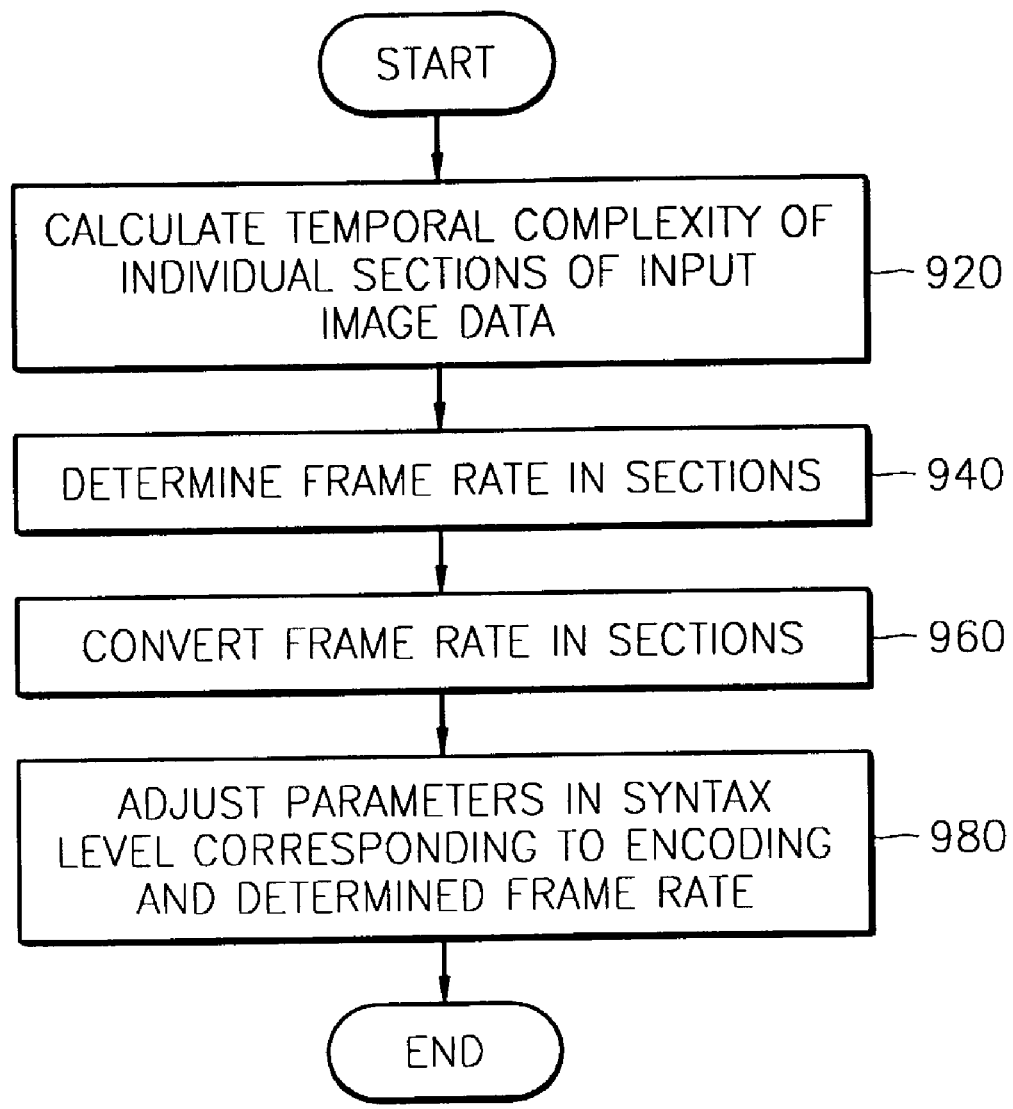

METHOD OF ADAPTIVELY ENCODING AND DECODING MOTION IMAGE AND APPARATUS THEREFOR

CROSS-REFERENCE TO RELATED APPLICATION

This application claims the benefit of Korean Patent Application No. 2002-28364, filed on May 22, 2002, in the Korean Intellectual Property Office, the disclosure of which is incorporated herein by reference.

BACKGROUND OF THE INVENTION

1. Field of the Invention

The present invention relates to motion image encoding and decoding methods and apparatuses, and more particularly, to a method of adaptively encoding and decoding motion images in accordance with a temporal complexity of an input image, and an apparatus therefor.

2. Description of the Related Art

With recent popularity of digital image recorders (DVR) or personal image recorders (PVR), researches and developments on image encoding are actively conducted. Existing DVRs or PVRs compress images at a fixed frame rate without considering a characteristic of an input image, that is, a temporal complexity of the input image, thus degrading an encoding efficiency of the input image.

FIG. 1 is a block diagram of a conventional motion image encoder. First of all, input image data of an input (motion) image is broken down into 8$\tilde{}$8 pixel blocks. A discrete cosine transform (DCT) unit 110 performs DCT on an 8$\tilde{}$8 pixel block of the input image data at a time in order to remove a spatial redundancy of the input image data. A quantization (Q) unit 120 quantizes DCT coefficients obtained by the DCT unit 120 and expresses the DCT coefficients in some representative values, thus achieving highly efficient loss-encoding. A variable length coding (VLC) unit 130 performs VLC on the quantized DCT coefficients and outputs an entropy-encoded data stream.

An inverse quantization (IQ) unit 140 inversely quantizes the quantized DCT coefficients obtained by the Q unit 120. An inverse DCT (IDCT) unit 150 performs IDCT on dequantized DCT coefficients obtained by the IQ unit 140. A frame memory 160 stores the IDCT-transformed image data obtained by the IDCT unit 150 on a frame-by-frame basis. A motion estimation (ME) unit 170 is used to remove a temporal redundancy from the IDCT-transformed image data using a currently received frame of the input image data and a previous frame of the input image data stored in the frame memory 160.

In order to perform data encoding, conventional DVRs or PVRs use an MPEG-2 encoder as shown in FIG. 1. If the input image data has not been encoded, the input image data is encoded by the MPEG-2 encoder to a bitstream, and the bitstream is stored in a storage medium, such as a hard disk drive (HDD) or a digital versatile disc (DVD). If the input image data has been encoded, a conventional motion image transcoder of FIG. 2 performs MPEG-2 decoding on the input image data to produce a desired MPEG-2 stream, performs predetermined scaling and format conversion on the produced MPEG-2 stream, and then performs MPEG-2 encoding on the resultant data.

Referring to FIG. 2, if the input image data of an input (motion) image is an encoded bitstream, the input image data is decoded by a motion image decoder 220 including a variable length decoding (VLD) unit 222, an IQ unit 224, an IDCT unit 226, a frame memory 228, and a motion compensation (MC) unit 230. Thereafter, the decoded bitstream is encoded with a given resolution by an MPEG-2 encoder 260 same as the motion image encoder of FIG. 1 in order to produce a desired MPEG-2 stream. Such a process is referred to as transcoding. Upon the transcoding, a scaling & format-conversion unit 240, as needed, down-scales the input image decoded by the motion image decoder 220 or converts a scan format of the decoded input image, and the MPEG-2 encoder 260 performs MPEG-2 encoding at a given frame rate.

As described above, in the prior art, the MPEG-2 encoding is always performed at a fixed frame rate. Accordingly, no matter whether the temporal complexity is high or low depending on characteristics of the input image, the encoding is performed at the same frame rate. Particularly, even when an incoming motion image hardly changes with time, the same frame rate must be maintained. This degrades an encoding efficiency.

SUMMARY OF THE INVENTION

To solve the above and the other problems, it is an aspect of the present invention to provide a method of adaptively encoding input image data of an input (motion) image in accordance with characteristics of the input image in order to improve an encoding efficiency, and an apparatus therefor.

Another aspect of the present invention is to provide a method of adaptively encoding a motion image in order to improve an efficiency of storage of encoded input image data when the input image data is stored in a hard disk driver (HDD) or a digital versatile disc (DVD) by MPEG-2 encoding, and an apparatus therefor.

Additional aspects and advantages of the invention will be set forth in part in the description which follows and, in part, will be obvious from the description, or may be learned by practice of the invention.

In order to achieve an aspect of the present invention, in a method of adaptively encoding input image data of an input (motion) image in accordance with a temporal complexity of the input image, first, the temporal complexity of the input image data is calculated. Next, a frame rate of the input image data is converted (adjusted) to a converted frame rate based on the calculated temporal complexity. Thereafter, the input image data whose frame rate has been converted is encoded, and encoding data of the encoded input image data is adjusted so that the encoded input image data has information on the converted frame rate.

According to another aspect of the present invention, the conversion of the frame rate of the input image data is performed by determining a frame rate value by comparing the calculated temporal complexity with at least one determined threshold value and then converting the frame rate of the input image data to the converted frame rate based on the determined frame rate value.

According to another aspect of the present invention, the calculation of the temporal complexity of the input image data is achieved by decoding the input image data and then calculating the temporal complexity using motion vectors obtained during decoding of the input image data.

According to another aspect of the present invention, the encoding data of the encoded input image data is at least one of the encoding data of a picture coding extension in a data structure of the encoded input image data. It is also possible that the encoding data is at least one of a repeat_first_field (RFF) value and a top_field_first (TFF) value of the picture coding extension.

According to another aspect of the present invention, if the calculated temporal complexity is equal to or greater than a first threshold value, the RFF and TFF values are both set to be 0. If the calculated temporal complexity is equal to or greater than a second threshold value and smaller than the first threshold value, the RFF and TFF values are set to be 1 and 0, respectively. If the calculated temporal complexity is smaller than the second threshold value, the RFF and TFF values are both set to be 1.

In order to achieve another aspect of the present invention, the apparatus for adaptively encoding input image data of an input (motion) image in accordance with a temporal complexity of the input image includes a temporal complexity calculation unit, a frame rate conversion unit, and an encoder. The temporal complexity calculation unit calculates the temporal complexity of the input image data. The frame rate conversion unit converts (adjusts) a frame rate of the input image data to a converted frame rate based on the calculated temporal complexity. The encoder encodes the input image data whose frame rate has been converted, and the encoded input image data is adjusted so that the encoded input image data has information on the converted frame rate.

According to another aspect of the present invention, the frame rate conversion unit further includes a frame rate determiner determining a frame rate value by comparing the calculated temporal complexity with at least one predetermined threshold value. The frame rate conversion unit converts the frame rate of the input image data to the converted frame rate based on the frame rate value determined by the frame rate determiner.

It is also possible that the temporal complexity calculation unit further includes a decoder decoding encoded input image data to calculate the temporal complexity using motion vectors obtained by the decoder.

According to another aspect of the present invention, encoding data of the encoded input data is at least one of the encoding data of the picture coding extension in a data structure of the encoded input image data. It is also possible that the encoding data is at least one of the RFF value and TFF value of the picture coding extension.

According to another aspect of the present invention, the frame rate conversion unit compares the calculated temporal complexity with first and second threshold values, and sets both the RFF and TFF values to be 0 if the calculated temporal complexity is equal to or greater than the first threshold value. If the calculated temporal complexity is equal to or greater than the second threshold value and smaller than the first threshold value, the frame rate conversion unit sets the RFF and TFF values to be 1 and 0, respectively. If the calculated temporal complexity is smaller than the second threshold value, the frame rate conversion unit sets both the RFF and TFF values to be 1.

BRIEF DESCRIPTION OF THE DRAWINGS

These and/or other aspects and advantages of the present invention will become apparent and more readily appreciated from the following description of the embodiments, taken in conjunction with the accompanying drawings of which:

FIG. 9 is a flowchart illustrating an adaptive motion image encoding method according to another embodiment of the present invention.

DETAILED DESCRIPTION OF THE PREFERRED EMBODIMENTS

Figure 1:
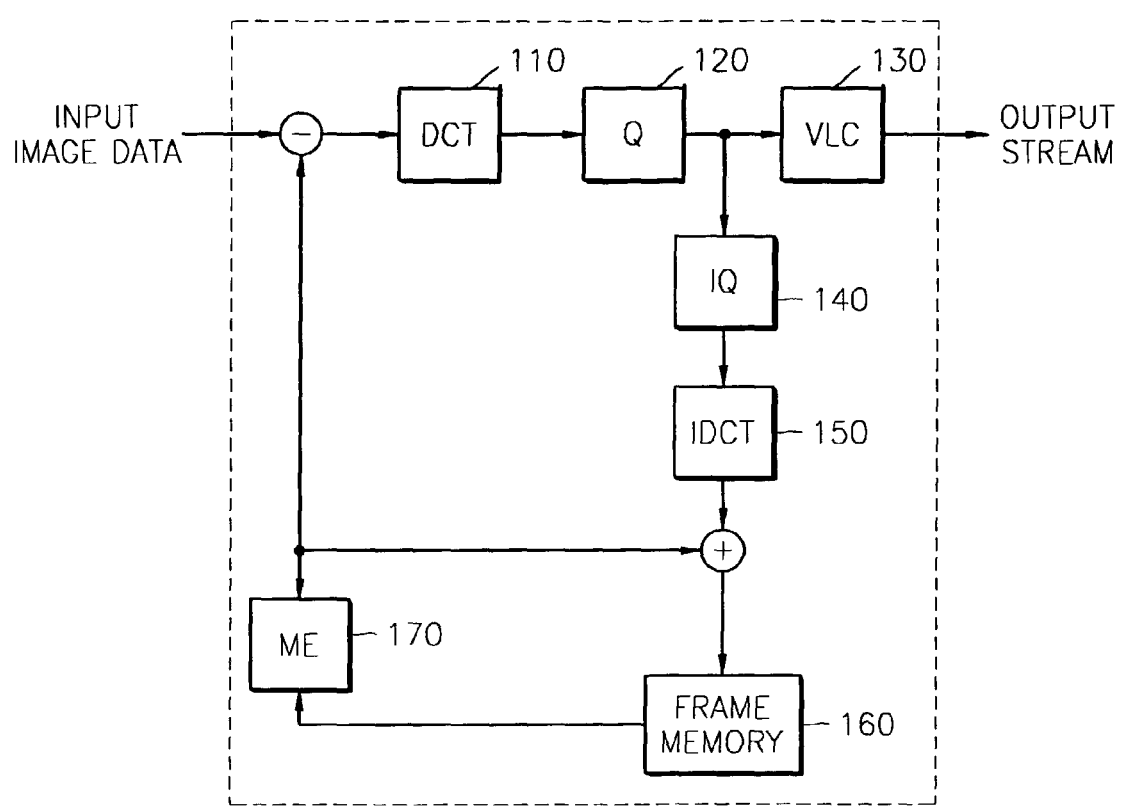
FIG. 1 is a block diagram of a conventional motion image encoder.
Figure 2:
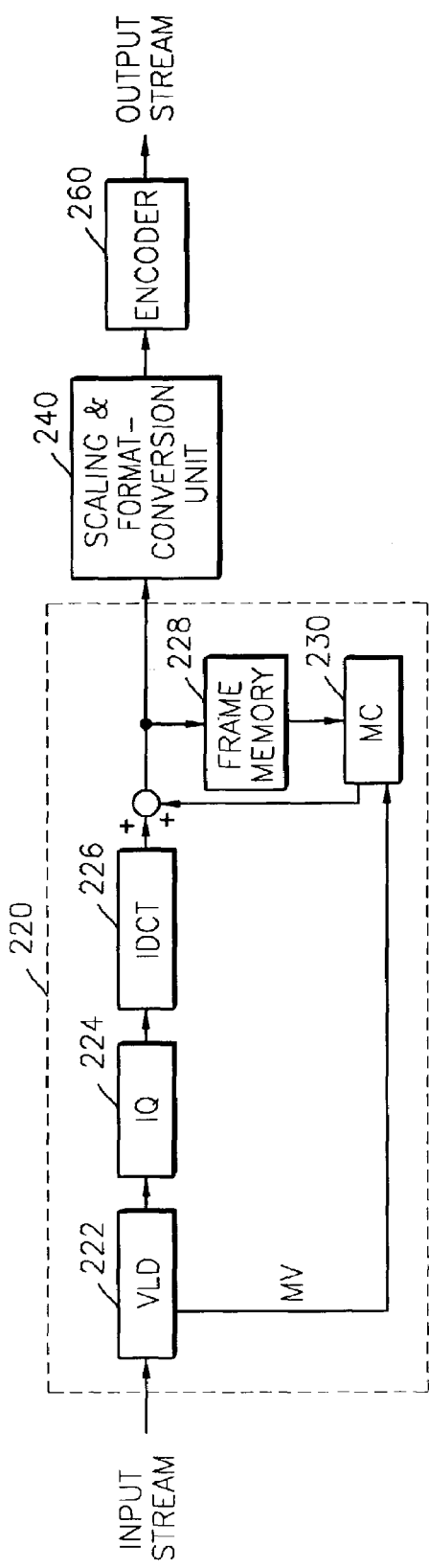
FIG. 2 is a block diagram of a conventional motion image transcoder.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 3:
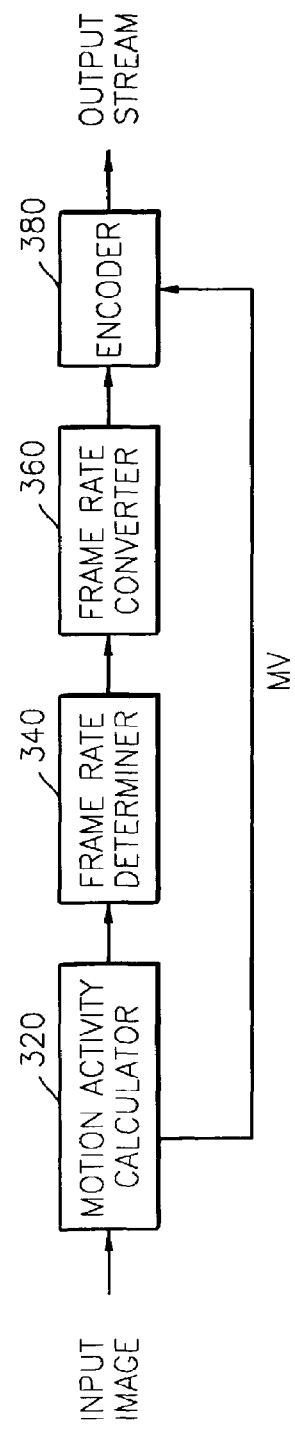
FIG. 3 is a block diagram of an adaptive motion image encoding apparatus encoding input image data of an input image in response to a temporal complexity of the input mage according to an embodiment of the present invention.

FIG. 3 is a block diagram of an adaptive motion image encoding apparatus encoding input image data of an input (motion) image in response to a temporal complexity of the input image according to an embodiment of the present invention. The motion image encoding apparatus includes a motion activity calculator 320, a frame rate determiner 340, a frame rate converter 360, and an encoder 380.

The motion activity calculator 320 calculates the temporal complexity of the input image in units of a predetermined-sized section. In this embodiment, 30 frames are determined as a unit section as an example. However, a group of pictures (GOP) or a sequence can be determined as a unit section for a temporal complexity calculation, or a user can determine an amount of the unit section.

In this embodiment, motion activity, that is, motion vector magnitude, is used to calculate the temporal complexity. Motion vector (MV) values of macroblocks existing within a determined unit section, that is, 30 frames, are calculated, and motion activities of the macroblocks are calculated from the calculated motion vector (MV) values and then averaged. If a MV value of a single macroblock is (MV1, MV2), the motion activity of the macroblock is $MV1^2+MV2^2$. In this way, the motion activity calculator 320 calculates mean motion activity per macroblock within 30 frames.

Although this embodiment uses the motion activity as a calculator, other calculators can be used to generate the temporal complexity of the input image.

The frame rate determiner 340 determines a frame rate value of the determined unit section by comparing the mean motion activity per macroblock received from the motion activity calculator 320 with predetermined threshold values. Here, considering a system environment (e.g., a buffer or memory capacity), the predetermined threshold values can be initially set, or arbitrarily determined by the user depending on a type of the input image. The threshold values can affect how to control the frame rate value determined by the frame rate determiner 340. The determined frame rate value can also be controlled by selecting several threshold values and comparing the selected threshold values with the calculated mean motion activity values.

When two threshold values TH1 and TH2 (TH1>TH2) are used, if the mean motion activity per macroblock is equal to or greater than TH1, the input image is encoded at the original frame rate. If the mean motion activity per macroblock is equal to or greater than TH2 and smaller than TH1, the input image is encoded at a half the original frame rate. If the mean motion activity per macroblock is smaller than TH2, the input image is encoded at one third of the original frame rate.

For example, when the original frame rate is 30 Hz and the two threshold values are 10 and 20, if the mean motion activity is equal to or greater than 20, the input image is encoded at 30 Hz. If the mean motion activity is equal to or greater than 10 and smaller than 20, the input image is encoded at 15 Hz. If the mean motion activity is smaller than 10, the input image is encoded at 10 Hz.

The threshold values TH1 and TH2 can be selected through an experiment. Although this embodiment uses the mean motion activity of each of the macroblocks within a determined unit section in order to determine the frame rate value of the determined unit section, the mean motion activity of a predetermined number of macroblocks can also be used.

The frame rate converter 360 controls (converts or adjusts) the frame rate of the input image data to a converted frame rate based on the frame rate value determined by the frame rate determiner 340 and outputs the converted frame rate to the encoder 380.

Figure 4A:
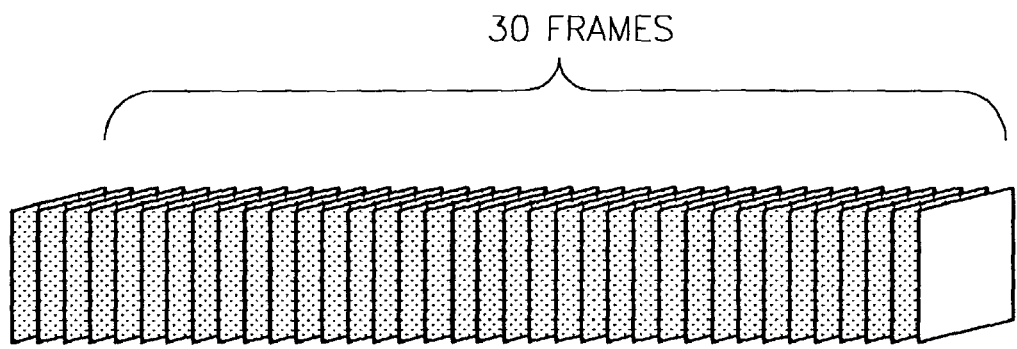
FIGS. 4A, 4B and 4C illustrate different frame rate conversions in different sections generated in the adaptive motion image encoding apparatus shown in FIG. 3.
Figure 4B:
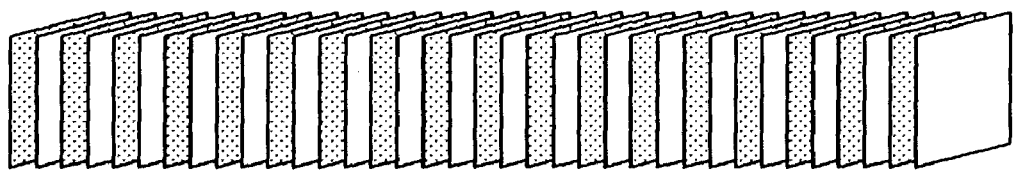
Figure 4C:
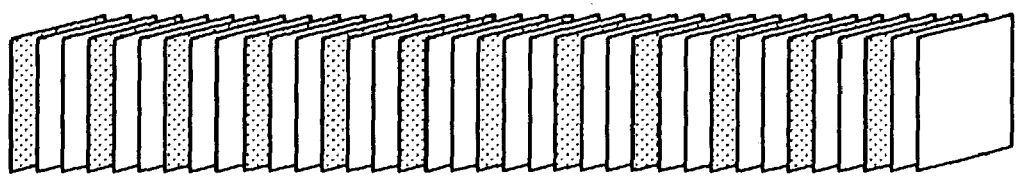

FIGS. 4A, 4B and 4C show different converted frame rates into which the frame rate converter 360 converts the frame rate based on the determined frame rate value. In FIGS. 4A, 4B, and 4C, black frames (dotted portion) are to be actually encoded, and white frames (not dotted portion) are to be skipped without being encoded. FIG. 4A shows a frame conversion performed when the mean motion activity per macroblock within 30 frames is equal to or greater than the first threshold value TH1. FIG. 4B shows another frame conversion performed when the mean motion activity per macroblock within 30 frames is smaller than the first threshold value TH1 and equal to or greater than the second threshold value TH2. FIG. 4C shows another frame conversion performed when the mean motion activity per macroblock within 30 frames is smaller than the second threshold value TH2.

The encoder 380, e.g., MPEG-2 encoder, encodes frames at the converted frame rates controlled by the frame rate converter 360 depending on a degree of the temporal complexity. In addition, during MPEG-2 encoding, parameters are appropriately controlled in a syntax level of an encoded bitstream so that the encoded bitstream has information representing the converted frame rates. This enables a decoder to perform decoding the encoded input image data, which is encoded at one of the converted frame rates, at the original frame rate.

In this embodiment, "repeat_first_field" (RFF) and "top_field_first" (TFF) values, which are the parameters of a picture coding extension of the syntax level in an architecture of the encoded input image data, are adequately set during MPEG-2 encoding.

To be more specific, when the frames in the unit section where the mean motion activity per macroblock is equal to or greater than TH1, are encoded at the original frame rate, the RFF and TFF values are both set to be 0.

When the frames in the unit section where the motion activity per macroblock is equal to or greater than TH2 and smaller than TH1 are encoded at a half of the original frame rate, the RFF and TFF values are set to be 1 and 0, respectively. Accordingly, the frames repeat once upon decoding.

Since the frames in the section where the motion activity per macroblock is smaller than TH1 are encoded at one-third of the original frame rate, the RFF and TFF values are both set to be 1. Accordingly, the frames repeat twice upon decoding.

Figure 5:
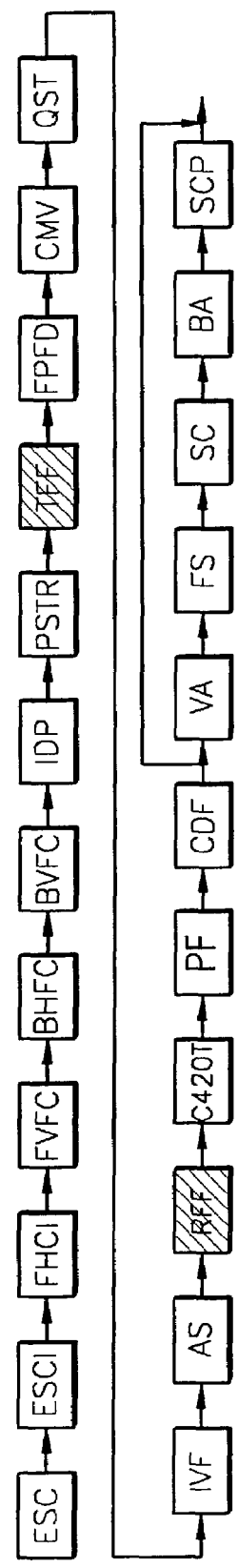
FIG. 5 shows a data structure of a picture coding extension in an MPEG-2 six-layer data architecture generated in the adaptive motion image encoding apparatus shown in FIG. 3.

FIG. 5 shows a data structure of a picture coding extension in an MPEG-2 six-layer data architecture. The parameters TFF and RFF out of encoding data of the picture coding extension are used in the motion image encoding apparatus of FIG. 3 so that a bitstream of the encoded input image data encoded at the converted frame rate has information on the converted frame rate. The data structure of the picture coding extension in the MPEG-2 six-layer data architecture includes ESC (extension start code), ESCI (extension start code identifier), FHFC (forward horizontal F code), FVFC (forward vertical F code), BHFC (backward horizontal F code), BVFC (backward vertical F code), IDP (intra DC precision), PSTR (picture structure), TFF (top field first), FPFD (frame predictive frame DCT), CMV (concealment motion vectors), QST (Q scale type), IVF (intra VLC format), AS (alternative scan), RFF (repeat first field), C420T (chroma 420 type), PF (progressive frame), CDF (composite display flag), VA (V axis), FS (field sequence), SC (sub carrier), BA (burst amplitude), and SCP (sub carrier phase) as shown in FIG. 5.

As described above, the motion image encoding apparatus enables the encoded bitstream to have the information on corresponding converted frame rate by appropriately controlling some parameters of the picture coding extension of the encoded bitstream.

Accordingly, a decoding apparatus decoding the bitstream encoded at the converted frame rate converted in the encoding apparatus according to the present invention can decode the encoded bitstream at the original frame rate based on the information in the encoded bitstream.

In addition, since the motion vectors calculated by the motion activity calculator 320 are used in the MPEG-2 encoding as shown in FIG. 3, an amount of calculation required for MPEG-2 encoding can be reduced.

Figure 6:
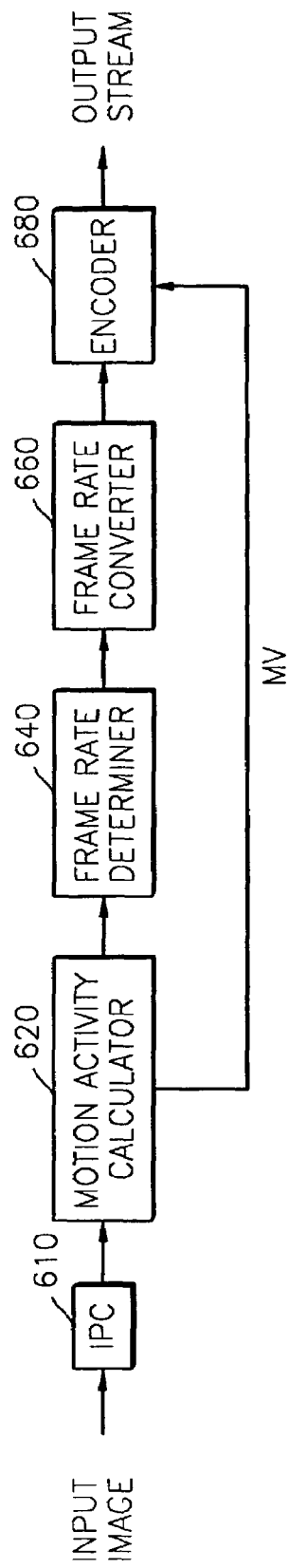
FIG. 6 is a block diagram of an adaptive motion image encoding apparatus encoding input image data of an input image in response to a temporal complexity of the input mage according to another embodiment of the present invention.

FIG. 6 shows an adaptive motion image encoding apparatus according to another embodiment of the present invention when an input image is not a progressive sequence. This motion image encoding apparatus includes an interlaced progressive converter (IPC) 610, a motion activity calculator 620, a frame rate determiner 640, a frame rate converter 660, and an encoder 680. The motion activity calculator 620, the frame rate determiner 640, the frame rate converter 660, and the encoder 680 perform the same operations as those of counterparts of FIG. 3, so they will not be described in detail.

When an input image is not a progressive sequence, it is converted into a progressive sequence by interlaced-to-progressive-conversion, and then the same encoding performed in the motion image encoding apparatus of FIG. 4 is performed.

In this embodiment, it is assumed that a frame rate and a spatial resolution of the input image received by the IPC 610 are maintained until the input image is output from the IPC 610. That is, it is assumed that a 30 Hz 720×480 interlaced image is converted into a 30 Hz 720×480 sequential image. However, during converting the interlaced image into the progressive sequence, the spatial resolution and the frame rate can be appropriately controlled by the user.

Figure 7:
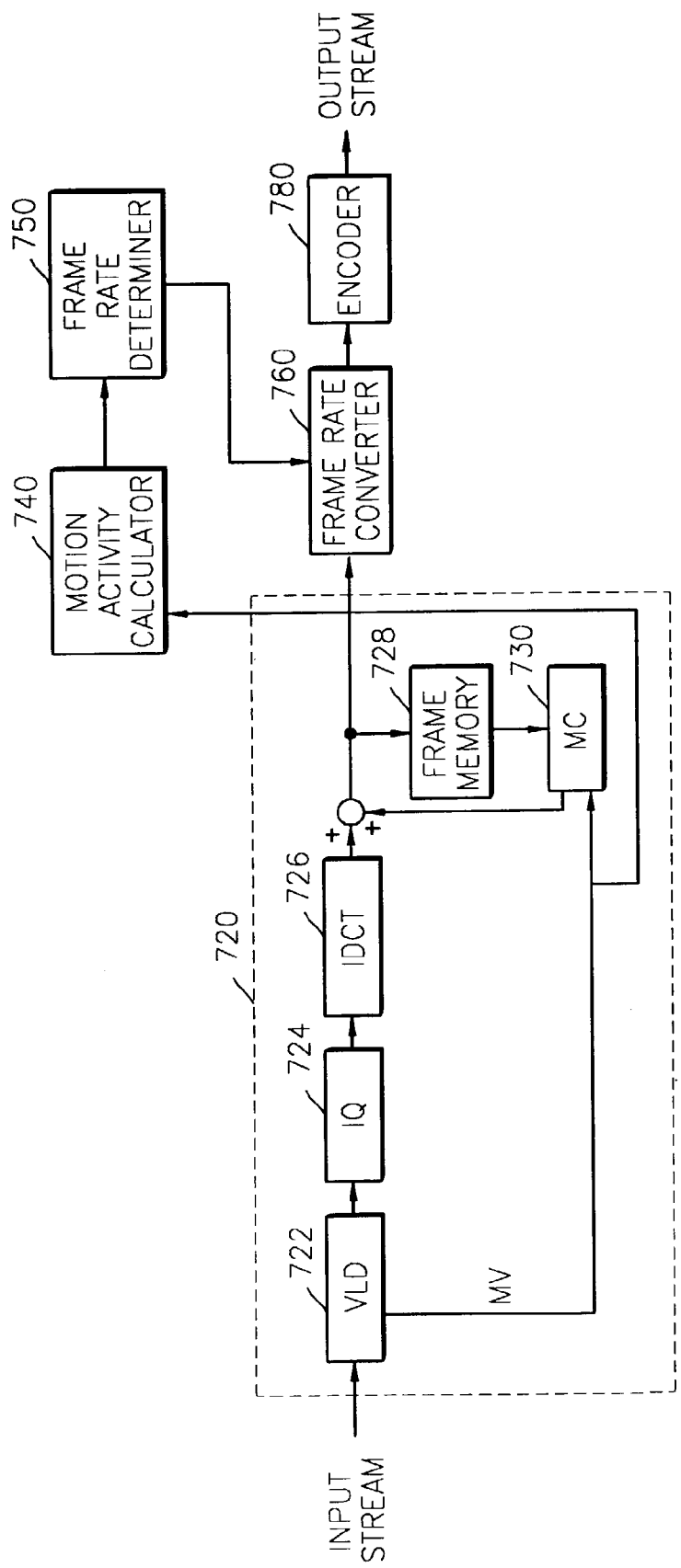
FIG. 7 is a block diagram of an adaptive motion image encoding apparatus encoding input image data of an input image in response to a temporal complexity of the input mage according to another embodiment of the present invention.

FIG. 7 shows an adaptive motion image encoding apparatus using temporal complexity to encode input image data of an input (motion) image according to another embodiment of the present invention. This adaptive motion image encoding apparatus includes a motion image decoder 720, a motion activity calculator 740, a frame rate determiner 750, a frame rate converter 760, and an encoder 780. The motion image decoder 720 includes a variable length decoder (VLD) 722, an inverse quantizer (IQ) 724, an inverse discrete cosine transformer (IDCT) 726, a frame memory 728, and a motion compensator (MC) 730.

The function units of the motion image decoder 720 perform the same operations as those of counterparts of a conventional MPEG decoder, so they will not be described in detail.

In this embodiment, during decoding, the motion activities of inter-macroblocks of B frames or P frames within a unit section are calculated and averaged to obtain the mean motion activity per macroblock within the unit section.

That is, if the input image data is an encoded stream, the motion activity calculator 740 calculates the motion activity of each of the macroblocks within the unit section using motion vectors (MVs) obtained upon decoding performed in the motion image decoder 720. Accordingly, unlike the motion activity calculator 320 of FIG. 3, the motion activity calculator 740 does not require any extra motion estimator to obtain the motion vectors.

For example, the motion activity calculator 740 receives the MVs from the VLD 722 and calculates the mean motion activity per macroblock using the received MVs.

The frame rate determiner 750, the frame rate converter 760, and the encoder 780 perform the same operations as those of the counterparts of FIG. 3, so they will not be described in greater detail.

The frame rate determiner 750 determines the frame rate value of the frames corresponding to the unit section by comparing the mean motion activity of per macroblock calculated by the motion activity calculator 740 with predetermined threshold values.

When two threshold values TH1 and TH2 (TH1>TH2) are used, if the mean motion activity per macroblock is equal to or greater than TH1, the frames are encoded at the original frame rate. If the mean motion activity per macroblock is equal to or greater than TH2 and smaller than TH1, the frames are encoded at half of the original frame rate. If the mean motion activity per macroblock is smaller than TH2, the frames are encoded at one third of the original frame rate.

The frame rate converter 760 controls (converts or adjusts) the frame rate of the input image data to the converted (controlled or adjusted) frame rate based on the frame rate value determined by the frame rate determiner 750 as shown in FIGS. 4A, 4B, and 4C and outputs it to the encoder 780.

The encoder 780, e.g., MPEG encoder, encodes the frames at the converted frame rates controlled by the frame rate converter 760 depending on the degree of the temporal complexity. In addition, during MPEG-2 encoding, some parameters in the syntax level of the encoded bitstream of the encoded input image data, that is, encoding data in the data architecture, are appropriately controlled so that the encoded bitstream has information representing the converted frame rates. This enables a decoder to perform decoding the encoded bitstream at the original frame rate.

As described above, the motion image encoding apparatus according to the present invention enables the encoded bitstream to have the information on corresponding converted frame rate by appropriately controlling some parameters of the picture coding extension of the encoded bitstream.

Accordingly, a decoding apparatus decoding the encoded bitstream encoded at the converted frame rate converted in the motion image encoding apparatus according to the present invention can decode the encoded bitstream at the original frame rate based on the information in the encoded bitstream.

Figure 8:
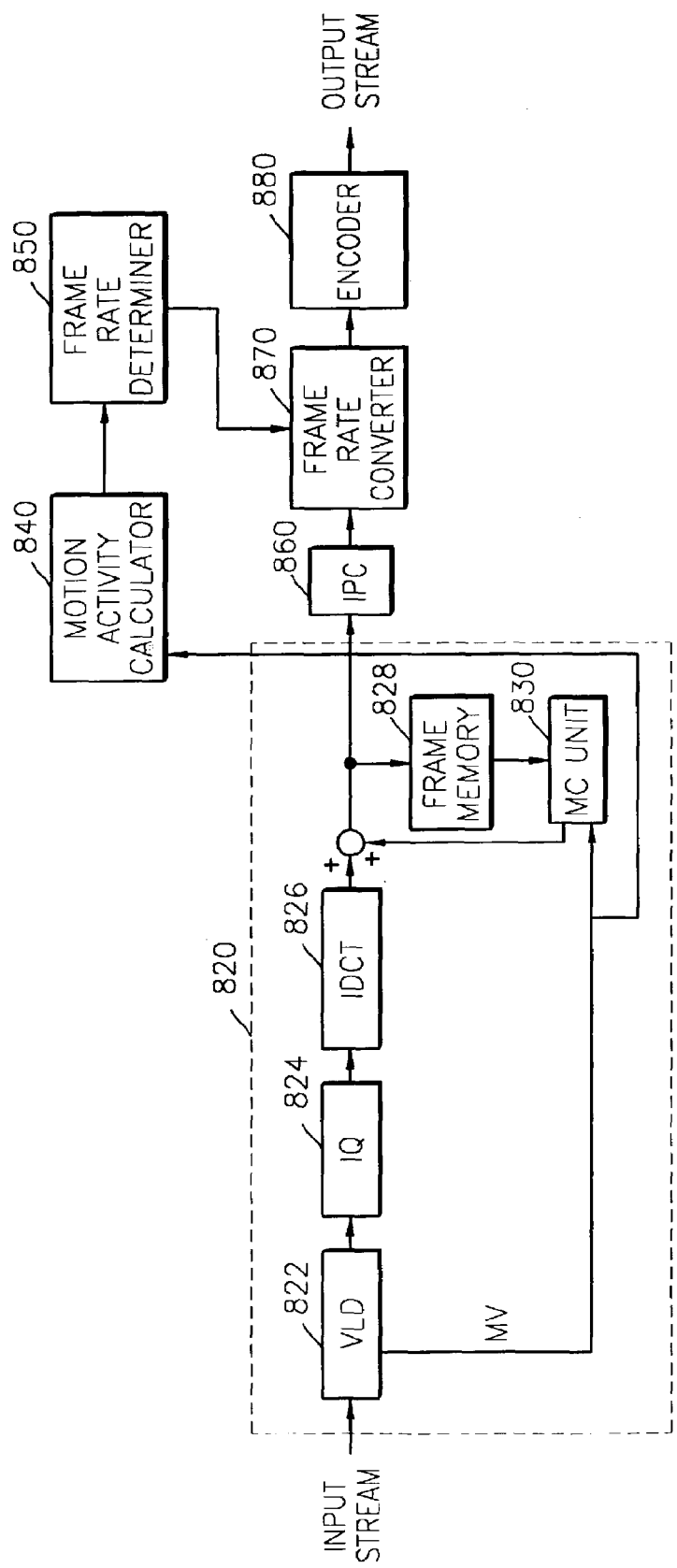
FIG. 8 is a block diagram of an adaptive motion image encoding apparatus encoding input image data of an input image in response to a temporal complexity of the input mage according to another embodiment of the present invention.

FIG. 8 shows an adaptive motion image encoding apparatus encoding input image data of an input image in accordance with a temporal complexity of the input image according to another embodiment of the present invention, provided the input image is not a progressive sequence but an interlaced encoded sequence. This adaptive motion image encoding apparatus includes a motion image decoder 820, a motion activity calculator 840, a frame rate determiner 850, an IPC 860, a frame rate converter 870, and an encoder 880. The motion image decoder 820 includes a VLD 822, an IQ 824, an IDCT 826, a frame memory 828, and an MC 830.

The motion image decoder 820, the motion activity calculator 840, the frame rate determiner 850, the frame rate converter 870, and the encoder 880 perform the same operations as the counterparts shown in FIG. 6, so they will not be described in detail.

When the input image is not the progressive sequence but the interlaced encoded sequence, the interlaced encoded sequence is decoded into decoded data by the motion image decoder 820. The decoded data is converted into the progressive sequence by interlaced progressive conversion performed by the IPC 860. Then, the same encoding performed in the motion image encoding apparatus of FIG. 6 is performed.

In this embodiment, it is assumed that a frame rate and a spatial resolution of the input image received by the IPC 860 are maintained until the input image is output from the IPC 860. That is, it is assumed that a 30 Hz 720×480 interlaced image is converted into a 30 Hz 720×480 sequential image. However, during converting the decoded data into the progressive sequence, the spatial resolution and the frame rate can be appropriately controlled by the user.

FIG. 9 is a flowchart illustrating an adaptive motion image encoding method using a temporal complexity of an input image to encode input image data of the input image according to the present invention. In operation 920, the temporal complexity of the input image data is calculated in units of a predetermined-sized section. Here, a mean motion activity per macroblock within a unit section is calculated using a motion activity, that is, a motion vector magnitude, in order to calculate the temporal complexity.

In operation 940, a frame rate value of the unit section is determined by comparing the mean motion activity per macroblock calculated in operation 920 with predetermined threshold values. When two threshold values TH1 and TH2 (TH1>TH2) are used, if the mean motion activity per macroblock is equal to or greater than TH1, the input image is encoded at the original frame rate. If the mean motion activity per macroblock is equal to or greater than TH2 and smaller than TH1, the input image is encoded at a half of the original frame rate. If the mean motion activity per macroblock is smaller than TH2, the input image is encoded at one third of the original frame rate.

In operation 960, the frame rate of the input image data is controlled (converted) into a converted frame rate based on the frame rate values determined in operation 940.

In operation 980, the input image data whose frame rate has been converted in operation 960 is encoded. Also, some parameters in a syntax level of encoding data of the encoded input image data, that is, in a data structure of an encoded bitstream of the encoded input image data, are appropriately controlled so that the encoded bitstream has information representing the converted frame rate. Here, the parameters are RFF and TFF values, which are the parameters of a picture coding extension of the syntax level in the architecture of the encoding data.

For example, upon MPEG-2 encoding, if the mean motion activity per macroblock is equal to or greater than TH1, the frames are encoded at the original frame rate. Accordingly, the RFF and TFF values are both set to be 0.

If the motion activity per macroblock is equal to or greater than TH2 and smaller than TH1, the frames are encoded at a half of the original frame rate, and the RFF and TFF values are set to be 1 and 0, respectively. Accordingly, the frames repeat once upon decoding.

If the motion activity per macroblock is smaller than TH1, the frames are encoded at one-third the original frame rate, and the RFF and TFF values are both set to be 1. Accordingly, the frames repeat twice upon decoding.

Recently, researches and developments on image encoding in DVRs or PVRs are actively conducted. The core of image encoding for storing is how to efficiently encode given images. Existing DVRs or PVRs only encode an image at a fixed frame rate and store the encoded image.

In order to solve the above and other problems generated by a conventional uniform encoding manner in which the input image data is encoded at a fixed frame rate, the present invention adopts a method of encoding the input image data of an input (motion) image of individual predetermined sections (for example, 30 frames or a group of pictures (GOP)) at different frame rates depending on the temporal complexity of each of the sections in accordance with the characteristics of the sections in which temporal complexity is high or low.

A section having low temporal complexity is encoded at a frame rate lower than the original frame rate, decoded by a decoder, magnified by interpolation, and then displayed. Another section having high temporal complexity, that is, a section having a significantly changing motion, is encoded at the original frame rate. This encoding manner improves an encoding rate without significant degradation of a quality of the input image, consequently improving a storage efficiency of an encoding or decoding apparatus.

As described above, the motion image encoding method according to the present invention enables the encoded bitstream to have the information on corresponding converted frame rate by appropriately controlling some parameters of the picture coding extension of the encoded bitstream.

Accordingly, a decoding apparatus for decoding a bitstream encoded at the converted frame rate converted from the original frame rate in the encoding apparatus according to the present invention can decode the encoded bitstream of the encoded input image data at the original frame rate based on the information attached to the encoded bitstream.

The motion image encoding method according to the present invention can be written as computer codes in a computer readable recording medium. The recording medium includes all kinds of recording media for storing data capable of being read by a computer system. For example, the recording medium includes ROM, RAM, CD-ROM, magnetic tapes, hard discs, floppy disks, flash memory, and optical data recording media. Also, the computer codes can be transmitted via a carrier wave such as Internet. The recording medium is decentralized in the computer system connected via a network, and the motion image encoding method can be written as computer codes and executed in a decentralization manner.

In the present invention described above, the temporal complexity of an image is calculated in predetermined-sized sections, the image section having a relatively low temporal complexity is encoded at a low frame rate lower than the original frame rate, and the image section having a relatively high temporal complexity is encoded at the original frame rate. The syntax level of the encoded input image data is appropriately set to decode the encoded input image data at the original frame rate. Thus, the input (motion) image can be more efficiently stored in a storage medium without degradation of a quality of the input image.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A method of adaptively encoding input image data of a motion image, the method comprising:

calculating a temporal complexity of the input image data;

converting an original frame rate of the input image data into a converted frame rate based on the calculated temporal complexity; and encoding the input image data whose frame rate has been converted and adjusting encoding data of the encoded input image data so that the encoded input image data has information on the converted frame rate, wherein the information on the converted frame rate is located in a unit of a sequence, a group of pictures, or a picture of the encoded input image data, the encoding data of the encoded input image data comprises a picture coding extension in a data structure of the encoded input image data, and the picture coding extension in a data structure of the encoded input image data comprises at least one of a repeat first field (RFF) value of the picture coding extension and a top field first (TFF) value of the picture coding extension.

2. The method of claim 1, wherein the converting of the original frame rate comprises:

determining a frame rate value by comparing the calculated temporal complexity with a threshold value; and converting the original frame rate of the input image data into the converted frame rate based on the determined frame rate value.

3. The method of claim 1, wherein the input image data is an encoded bitstream, and the calculating of the temporal complexity comprises:

decoding the encoded bitstream of the input image data; and calculating the temporal complexity using motion vectors obtained during decoding the encoded bitstream.

4. The method of claim 1, wherein the encoding of the input image data comprises:

setting both the RFF and TFF values to be 0 if the calculated temporal complexity is equal to or greater than a first threshold value;

setting the REF and TFF values to be 1 and 0, respectively, if the calculated temporal complexity is at or between a second threshold value and the first threshold value; and setting both the RFF and TFF values to be 1 if the calculated temporal complexity is less than the second threshold value.

5. The method of claim 4, wherein the first threshold value is greater than the second threshold value.

6. The method of claim 1, wherein the input image data comprises macroblocks, and the calculating of the temporal complexity comprises:

calculating a motion activity per macroblock of the input image data.

7. The method of claim 6, wherein the macroblock has a motion vector, and the calculating of the motion activity comprises:

calculating a magnitude of the motion vector of the macroblock.

8. The method of claim 7, wherein, if the motion vector of the macroblock is (MV1,MV2), the motion activity is $MV1^2+MV2^2$.

9. The method of claim 1, wherein the input image data comprises a number of sections, and the calculating of the temporal complexity and the determining of the frame rate comprise:

calculating the temporal complexity from a unit section having a predetermined number of the sections of the input image data.

10. The method of claim 9, wherein the unit section of the input image data is a group of pictures (GOP).

11. The method of claim 9, wherein the unit section of the input image data is a sequence.

12. An apparatus for adaptively encoding input image data of a motion image, comprising:

a temporal complexity calculation unit calculating a temporal complexity of the input image data;

a frame rate conversion unit converting an original frame rate of the input image data into a converted input image data based on the calculated temporal complexity; and an encoder encoding the input image data whose frame rate has been converted and adjusting the encoded image data so that the encoded image data has information on the converted frame rate, wherein the information on the converted frame rate is located in a unit of a sequence, a group of pictures, or a picture of the encoded input image data, the information on the converted frame rate comprises data of a picture coding extension in a data structure of the encoded input image data, and the picture coding extension in a data structure of the encoded input image data comprises at least at least one of an REF value of the picture coding extension and a TFF value of the picture coding extension.

13. The apparatus of claim 12, wherein the frame rate conversion unit further comprises:

a frame rate determiner determining a frame rate value by comparing the calculated temporal complexity with a threshold value, the frame rate of the input image data converted into the converted frame rate based on the frame rate value determined by the frame rate determiner.

14. The apparatus of claim 12, wherein the input image data comprises an encoded data, and the temporal complexity calculation unit further comprises:

a decoder decoding the encoded data of the input image data using motion vectors of the encoded data, and the temporal complexity is calculated using the motion vectors obtained by the decoder.

15. The apparatus of claim 12, wherein the frame rate conversion unit sets both the RFF and TFF values to be 0 if the calculated temporal complexity is equal to or greater than a first threshold value, sets the RFF and TFF values to be 1 and 0, respectively, if the calculated temporal complexity is at or between a second threshold value and the first threshold value, and sets both the RFF and TFF values to be 1 if the calculated temporal complexity is less than the second threshold value.

16. The apparatus of claim 15, wherein the first threshold value is greater than the second threshold value.

17. The apparatus of claim 16, wherein the input image data is not a progressive sequence, and the temporal complexity calculation unit converts the input image data into a sequence as the input image data.

18. The apparatus of claim 16, wherein the input image data comprises a plurality of groups of pictures (GOPs), the temporal complexity calculation unit calculates the temporal complexity from a predetermined number of the GOPs, and the frame rate conversion unit converts the original frame rate into the converted frame data in response to the calculated temporal complexity of the predetermined number of the GOPs.

19. The apparatus of claim 18, wherein the macroblock has a motion vector, and the motion activity is a magnitude of the motion vector of the macroblock.

20. The apparatus of claim 19, wherein, if the motion vector of the macroblock is (MV1,MV2), the motion activity is $MV1^2+MV2^2$.

21. The apparatus of claim 12, wherein the input image data comprises a plurality of macroblocks, and the temporal complexity is calculated based on motion activity per macroblock of the input image data.

* * * * *

UNITED STATES PATENT AND TRADEMARK OFFICE
CERTIFICATE OF CORRECTION

PATENT NO. : 7,457,471 B2
APPLICATION NO. : 10/326271
DATED : November 25, 2008
INVENTOR(S) : Byung-cheol Song et al.

It is certified that error appears in the above-identified patent and that said Letters Patent is hereby corrected as shown below:

Title Page, Column 1 (Assignee), Line 1, change "Co.." to --Co.,--.

Column 10, Line 55, change "REF" to --RFF--.

Column 11, Line 38, before "one" delete "at least".

Column 11, Line 39, change "REF" to --RFF--.

Signed and Sealed this

Twenty-fourth Day of February, 2009

JOHN DOLL
*Acting Director of the United States Patent and Trademark Office*